United States Patent Office 3,414,542
Patented Dec. 3, 1968

3,414,542
POLYCARBONATES
John Vitrone, Parsippany-Troy Hills Township, Morris County, N.J., assignor to Allied Chemical Corporation, New York, N.Y., a corporation of New York
No Drawing. Original application Sept. 25, 1961, Ser. No. 140,220, now Patent No. 3,232,993, dated Feb. 1, 1966. Divided and this application July 12, 1965, Ser. No. 471,473
4 Claims. (Cl. 260—47)

ABSTRACT OF THE DISCLOSURE

Polycarbonates are formed by the reaction of phosgene with halogenated bisphenols of the formula:

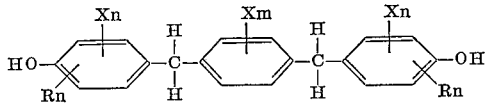

wherein R is a member of the group consisting of hydrogen and alkyl radicals, preferably lower alkyl radicals (i.e., containing from 1 to 4 carbon atoms), X is a halogen, $n$ is an integer from 0 to 4 and $m$ is an integer from 1 to 4. X may be the same or different halogens, but, in each case, is preferably chlorine. These polycarbonates are flame resistant and have high glass transition and fusion temperatures. They may be molded into tough, clear and nonflammable films.

---

This application is a division of application Ser. No. 140,220, filed Sept. 25, 1961, now U.S. Patent No. 3,232,993, issued Feb. 1, 1966.

This invention relates a new group of halogenated bisphenols and to their preparation.

The halogenated bisphenols of this invention may be represented by the following general formula:

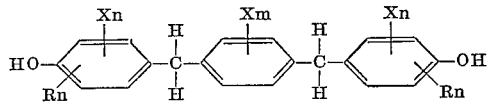

in which R is a member of the group consisting of hydrogen and alkyl radicals, preferably lower alkyl radicals (i.e., containing from 1 to 4 carbon atoms), X is a halogen, $n$ is an integer from 0 to 4 and $m$ is an integer from 1 to 4. X may be the same or different halogens, but, in each case, is preferably chlorine. The following halogenated bisphenols are illustrative of those within the scope of this invention:

1,4-bis(p-hydroxybenzyl) 2-chlorobenzene
1,4-bis(p-hydroxybenzyl) 2-bromobenzene
1,4-bis(p-hydroxybenzyl) 2,3-dichlorobenzene
1,4-bis(p-hydroxybenzyl) 2,3-difluorobenzene
1,4-bis(p-hydroxybenzyl) 2,6-dibromobenzene
1,4-bis(p-hydroxybenzyl) 2,3,5,6-tetrachlorobenzene
1,4-bis(p-hydroxybenzyl) 2,3,5,6-tetrabromobenzene
1,4-bis(4-hydroxy-3-chlorobenzyl) 2,3,5,6-tetrachlorobenzene
1,4-bis(4-hydroxy-3-methylbenzyl) 2,3,5,6-tetrachlorobenzene
1,4-bis(4-hydroxy-3,5-dibromobenzyl) 2,3,5,6-tetrabromobenzene
1,4-bis(4-hydroxy-3,5-dimethylbenzyl) 2,3,5,6-tetrachlorobenzene
1,4-bis(4-hydroxy-3-chloro-5-methylbenzyl) 2,3,5,6-tetrachlorobenzene Conventionally, bisphenols are prepared by the condensation of phenols with carbonyl compounds in the presence of a mineral acid catalyst. Although these methods have been heretofore successfully employed, it has been discovered that they are not applicable for the preparation of the halogenated bisphenols of this invention.

According to the present invention, a halogenated bisphenol is produced by reacting an α,α'-di-halo-p-xylene compound having the following general formula:

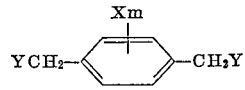

in which X is a halogen (preferably chlorine), Y is a halogen (preferably chlorine) and $m$ is an integer from 1 to 4, with at least a stoichiometric amount of a phenolic compound having the following general formula:

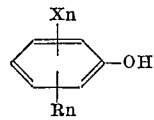

in which R is a member of the group consisting of hydrogen and alkyl radicals (preferably lower alkyl radicals), X is a halogen (preferably chlorine) and $n$ is an integer from 0 to 4, at temperature of about 80° to 180° C. in the presence of an anhydrous acid-activated clay as catalyst and recovering the halogenated bisphenol from the resulting reaction mass. The reaction which takes place may be represented by the following equation:

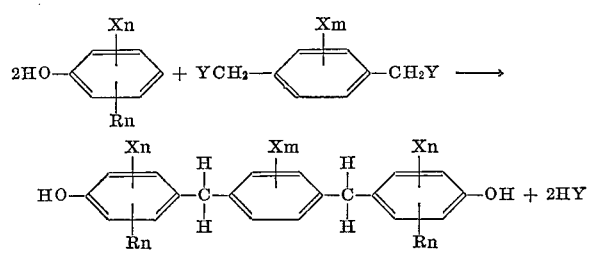

X and Y may be the same or different halogens but, as indicated above, each is preferably chlorine.

Among the suitable halogenated xylene reactants are:

α,α',2-trichloro-p-xylene
α,α',dichloro-2-bromo-p-xylene
α,α',2,3-tetrachloro-p-xylene
α,α',dichloro-2,3-difluoro-p-xylene
α,α',dichloro-2,6-dibromo-p-xylene
α,α',2,3,5,6-hexachloro-p-xylene
α,α',dichloro-2,3,5,6-tetrabromo-p-xylene Among the suitable phenolic reactants are:

phenol
2-chlorophenol
2-methylphenol
2,6-dimethylphenol
2-chloro-6-methylphenol

Although the reaction may be carried out using stoichiometric quantities of the halogenated xylene compound and phenolic compound, it has been discovered that greater efficiency and higher yields of product are obtained when about 4 to 10 mols of phenolic compound per mol of the halogenated xylene are employed.

Generally speaking, an acid-activated clay consisting mainly of silica and alumina is used as catalyst in the process of this invention. Preferably, the catalyst comprises an acid-activated clay of the non-swellable, bentonite-type. This type of clay contains about 40 to 65 percent by weight of silica and about 3 to 20 percent by weight of alumina, as well as small quantities of one or more oxides of other metals such as iron, magnesium, sodium, calcium and potassium.

The water content of the acid-activated clay negatively affects its activity as catalyst. Hence, the clay must be employed in anhydrous form. This may be effectively accomplished by treating the clay, either before or after its addition, with a suitable low-boiling solvent, such as benzene, toluene, cyclohexane, etc., and then distilling off the water in the form of an azeotrope with the solvent.

If the clay on hand is not acid-activated, it may be activated by any suitable procedure. For example, a slurry of one part by weight of clay to 10 parts by weight of 5 percent sulfuric acid solution may be boiled for a period of one hour. The excess spent acid may then be separated from the clay first by settling and decantation and then by wringing the wet clay. The "mud" thus produced may then be dried to a powder in a flash drier.

Generally speaking, an amount of acid-activated clay equivalent to about 5 to 30 percent by weight of the phenol reactant is employed, about 8 to 12 percent by weight being preferred.

The reaction may be carried out at temperature within the range of about 80° to 180° C.; however, particularly outstanding results are obtained when the reaction temperature is maintained within the range of about 140° to 180° C. Although the time of reaction may be as little as about 1.5 hours, completion of the reaction generally requires at least about 3 to 6 hours.

The halogenated bisphenols may be recovered from the reaction mass by any convenient means. For example, the reaction mass may be filtered to remove the clay, and unreacted phenolic compound extracted from the mass with hot water. The crude product may then be purified by means well known in the art, as by recrystallization from a suitable solvent such as methyl alcohol, isopropyl alcohol, dioxane or dimethylformamide.

In preferred operation, the halogenated xylene and phenolic reactants are mixed, and an acid-activated clay in anhydrous form is added to the mixture. The reaction mixture is then heated at temperature of about 140° to 180° C. for a period 3 to 6 hours. The resulting reaction mass is filtered to remove the clay, and unreacted phenolic compound is extracted with hot water. The crude product is then recrystallized from a suitable solvent as described above.

The following examples are given for the purpose of illustrating the present invention but are not intended to be limiting on the scope thereof. In the examples, parts are by weight.

Example 1

940 parts of phenol and 159.5 parts of α,α',2,3,5,6-hexachloro-p-xylene were mixed and heated to temperature of about 60° C. 50 parts of an acid-activated, bentonite clay (containing about 64 percent by weight of silica, about 17 percent by weight of alumina and also small amounts of iron oxide, magnesium oxide and calcium oxide) were added. About 90 parts of benzene were introduced into the reaction mixture, and water present in the clay was removed by azeotropic distillation. The remaining benzene was then distilled off, and the reaction temperature was maintained at 160° C. for a period of 6 hours.

The resulting reaction mass was filtered to remove the clay, and unreacted phenol was extracted with hot water. The crude product was then crystallized three times from 80 percent aqueous methyl alcohol and once from anhydrous isopropyl alcohol. A white crystalline material, comprising substantially pure 1,4-bis(p-hydroxybenzyl) 2,3,5,6-tetrachlorobenzene having a melting point of about 262° to 264° C. with slight decomposition, was produced. Elemental analysis of the product gave 56.24 percent carbon and 3.5 percent hydrogen (theory—56.08 percent carbon and 3.3 percent hydrogen).

940 parts of phenol and 396 parts of α,α',2,3,5,6-hexachloro-p-xylene were mixed and treated with 100 parts of the acid-activated clay employed in Example 1. 86.6 parts of toluene were added to the reaction mixture, and the water present in the clay was removed by azeotropic distillation for 1 hour at about 150° to 160° C. Upon completing dehydration of the clay, the reaction commenced and proceeded for 3.5 hours at 165° C.

The resulting reaction mass was cooled to 80° C., and the clay catalyst was filtered off. Unreacted phenol was removed by extraction with hot water. After 3 recrystallizations from isopropanol, a white crystalline material, comprising substantially pure 1,4-bis(p-hydroxybenzyl) 2,3,5,6-tetrachlorobenzene, was produced.

Example 3

240 parts of 2,6-dimethylphenol were mixed with 62 parts of α,α',2,3,5,6-hexachloro-p-xylene. 50 parts of the acid-activated clay employed in Example 1 were added, followed by about 86.6 parts of toluene. The reaction mixture was heated in order to remove the water present in the clay by azeotropic distillation. The reaction temperature was then elevated to about 140° to 150° C. and maintained there for a period of 1 hour.

The resulting reaction mass was cooled to about 80° C. and filtered. The solid residue containing the clay catalyst and the crude product was first washed with toluene and then treated with hot dioxane which dissolved the product. The clay was filtered off, and the crude product crystallized out on cooling. The product was then recrystallized from dioxane and dimethylformamide to produce 1,4-bis(4-hydroxy-3,5-dimethylbenzyl) 2,3,5,6-tetrachlorobenzene having a melting point of 310° to 313° C. with slight decomposition. Elemental analysis of the product gave 60.0 percent carbon, 4.97 percent hydrogen and 29.3 percent chlorine, as compared to the theoretical values of 59.5 percent carbon, 4.5 percent hydrogen and 29.3 percent chlorine. Titration of the phenolic hydroxy groups gave 7.18 percent as aganist the theoretical value of 7.02 percent.

The halogenated bisphenols of this invention are useful in the preparation of more complex organic derivatives, including polycarbonates and epoxy resins. When, for example, the sodium salt of 1,4-bis(p-hydroxybenzyl) 2,3,5,6-tetrachlorobenzene is reacted with phosgene, a polycarbonate is produced. An epoxy resin is formed when 1,4-bis(p-hydroxybenzyl) 2,3,5,6-tetrachlorobenzene is reacted with epichlorohydrin in an alkaline medium.

In a typical example for making a polycarbonate, phosgenation of a slurry of the sodium salt of 1,4-bis (p-phydroxybenzyl) 2,3,5,6-tetrachlorobenzene in an aqueous sodium hydroxide-ethylene chloride interfacial system gave a high yield (82 percent of theory) of ethylene chloride-insoluble crystalline polymer having an inherent viscosity of 0.2 to 0.3 in symmetrical tetrachloroethane. The polymer had a glass transition temperature of about 170° C., a fusion temperature of about 290° C. and was flame-resistant. A tough, clear and non-flammable film was compression molded from the polymer at 300° C.

While the preferred embodiments for carrying out this invention have been described, it will be apparent that many changes may be made therein without departing from the spirit of the invention.

I claim:

1. A polycarbonate consisting essentially of recurring units of the structure:

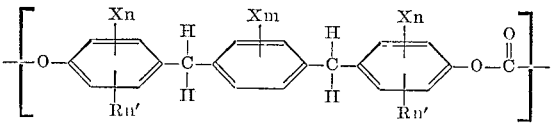

wherein R is a hydrogen or alkyl radical, X is a halogen, $n$ is an integer from 0 to 4 and $n'$ is an integer from 0 to the sum of $n$ and $n'$ being less than 5, and $m$ is an integer from 1 to 4.

2. A polycarbonate consisting essentially of recurring units of the structure:

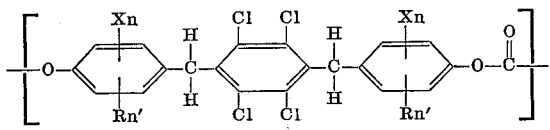

wherein R is a hydrogen or alkyl radical, X is a halogen, $n$ is an integer from 0 to 4 and $n'$ is an integer from 0 to 4, the sum of $n$ and $n'$ being less than 5.

3. A polycarbonate in accordance with claim 2, wherein $n$ and $n'$ are both 0, said polycarbonate having a glass transition temperature of about 170° C.

4. A tough, clear and nonflammable molded film consisting essentially of the polymer of claim 3.

References Cited
UNITED STATES PATENTS

| | | | |
|---|---|---|---|
| 3,028,365 | 4/1962 | Schnell et al. | 260—47 |
| 3,094,508 | 6/1963 | Butterworth et al. | 260—47 |
| 3,248,365 | 4/1966 | Oxenrider et al. | 260—47 |
| 3,251,805 | 5/1966 | Schnell et al. | 260—47 |

SAMUEL H. BLECH, *Primary Examiner.*